(12) United States Patent
Kawai et al.

(10) Patent No.: US 7,849,980 B2
(45) Date of Patent: Dec. 14, 2010

(54) DISK BRAKING DEVICE AND MOTORCYCLE PROVIDED WITH THE DISK BRAKING DEVICE

(75) Inventors: Hideo Kawai, Shizuoka (JP); Manabu Abe, Shizuoka (JP); Itsurou Migita, Shizuoka (JP); Kazuaki Ura, Shizuoka (JP); Masatoshi Kurita, Shizuoka (JP); Fujio Ikki, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 708 days.

(21) Appl. No.: 11/468,224

(22) Filed: Aug. 29, 2006

(65) Prior Publication Data

US 2007/0045057 A1  Mar. 1, 2007

(30) Foreign Application Priority Data

Aug. 30, 2005  (JP) .............................. 2005-249313

(51) Int. Cl.
*F16D 65/12* (2006.01)

(52) U.S. Cl. .................... 188/218 XL; 188/17; 188/26; 188/72.4

(58) Field of Classification Search ............... 188/72.4, 188/218 XL, 18 A
See application file for complete search history.

(56) References Cited

U.S. PATENT DOCUMENTS

| 3,480,310 | A | * | 11/1969 | McElwain | ................ 403/322.2 |
| 3,937,303 | A | * | 2/1976 | Allen et al. | ................ 188/73.2 |
| 4,821,848 | A | | 4/1989 | Izumine | |
| 6,131,707 | A | * | 10/2000 | Buechel et al. | ........ 188/218 XL |
| 7,044,272 | B2 | | 5/2006 | Takizawa | |
| 7,374,025 | B2 | | 5/2008 | Takeuchi | |
| 7,475,758 | B2 | * | 1/2009 | Dimsey et al. | ................. 188/26 |
| 2004/0011608 | A1 | * | 1/2004 | Tironi et al. | .......... 188/218 XL |
| 2004/0200674 | A1 | | 10/2004 | Campbell | |
| 2005/0139431 | A1 | | 6/2005 | Takizawa | |
| 2005/0161296 | A1 | * | 7/2005 | Okabe | ................... 188/218 XL |
| 2007/0187189 | A1 | | 8/2007 | Takeuchi | |

FOREIGN PATENT DOCUMENTS

| DE | 29910528 U1 | 9/1999 |
| EP | 0287017 A2 | 10/1988 |
| EP | 1548318 A1 | 6/2005 |
| JP | 2002227891 A | 8/2002 |
| JP | 2004169738 A | 6/2004 |
| WO | 0246639 A1 | 6/2002 |
| WO | WO 2004/042247 A1 | 5/2004 |
| WO | 2005040631 A1 | 5/2005 |

OTHER PUBLICATIONS

European Search Report for corresponding European application 06018113.8 lists the references above.

* cited by examiner

*Primary Examiner*—Bradley T King
*Assistant Examiner*—James K Hsiao
(74) *Attorney, Agent, or Firm*—Keating & Bennett, LLP

(57) ABSTRACT

A disk braking device for a motorcycle ensures radiation quality of a disk plate and reduces friction member abrasion of a friction member. A plurality of through-holes are formed in the disk plate and a plurality of notches are formed at peripheral edges of the disk plate. The through-holes are arranged so that one of the through-holes or less is disposed on a radial line extending from the center of the disk plate.

8 Claims, 4 Drawing Sheets

US 7,849,980 B2

DISK BRAKING DEVICE AND MOTORCYCLE PROVIDED WITH THE DISK BRAKING DEVICE

RELATED APPLICATIONS

This application claims the benefit of priority under 35 USC 119 of Japanese patent application No. 2005-249313, filed on Aug. 30, 2005, which application is hereby incorporated by reference in its entirety.

BACKGROUND OF THE INVENTION

1. Field of the Invention

The present invention relates to a disk braking device in which a disk plate fixed to a wheel is interposed by friction members, and a motorcycle provided with the disk braking device.

2. Description of Related Art

In some disk braking devices for motorcycles there are a multiplicity of "lightening" holes formed at circumferential intervals on the disk plate in order to decrease the weight of the disk plate. In addition, recesses are sometimes formed at circumferential intervals at an outer edge of the disk plate in order to suppress brake noise (see, for example, WO 2004/042247).

In such disk plates, the lightening holes are typically arranged in a radially aligned and parallel configuration, and a heat insulation portion is formed in a radial direction. This leads to impaired disk plate heat radiation quality and makes the friction members more liable to wear.

SUMMARY OF THE INVENTION

The invention overcomes these drawbacks and provides a disk braking device with improved heat radiation quality and decreased friction member abrasion.

The invention provides a disk braking device comprising a disk plate fixed to a wheel. A brake pad has a friction member that generates a frictional force between it and the disk plate. The disk plate includes a plurality of through-holes and a plurality of notches formed at a peripheral edge of the disk plate. The through-holes are formed such that a radial line passing through a center of the disk plate passes through one or less through-holes. The notches are arranged such that a radial line passing through a through-hole passes through a notch.

With the disk braking device according to the invention, since only one through-hole is formed on a radial line passing through a center of the disk plate, a heat conduction path through which frictional heat generated in through-hole portions of the plate is conducted to an outer peripheral edge is provided. Thus, radiation quality is increased and abrasion of friction members is decreased. This is in contrast to the prior art, where multiple through-holes are aligned on a radial line and interrupt the heat conduction path, thereby decreasing radiation quality.

Also, since the notches are arranged so that any one of the radial lines passing through a through-hole also passes through a notch, heat generated in through-hole portions formed on the radial line is readily discharged outside from the notch, further heightening radiation quality.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Figure 1:
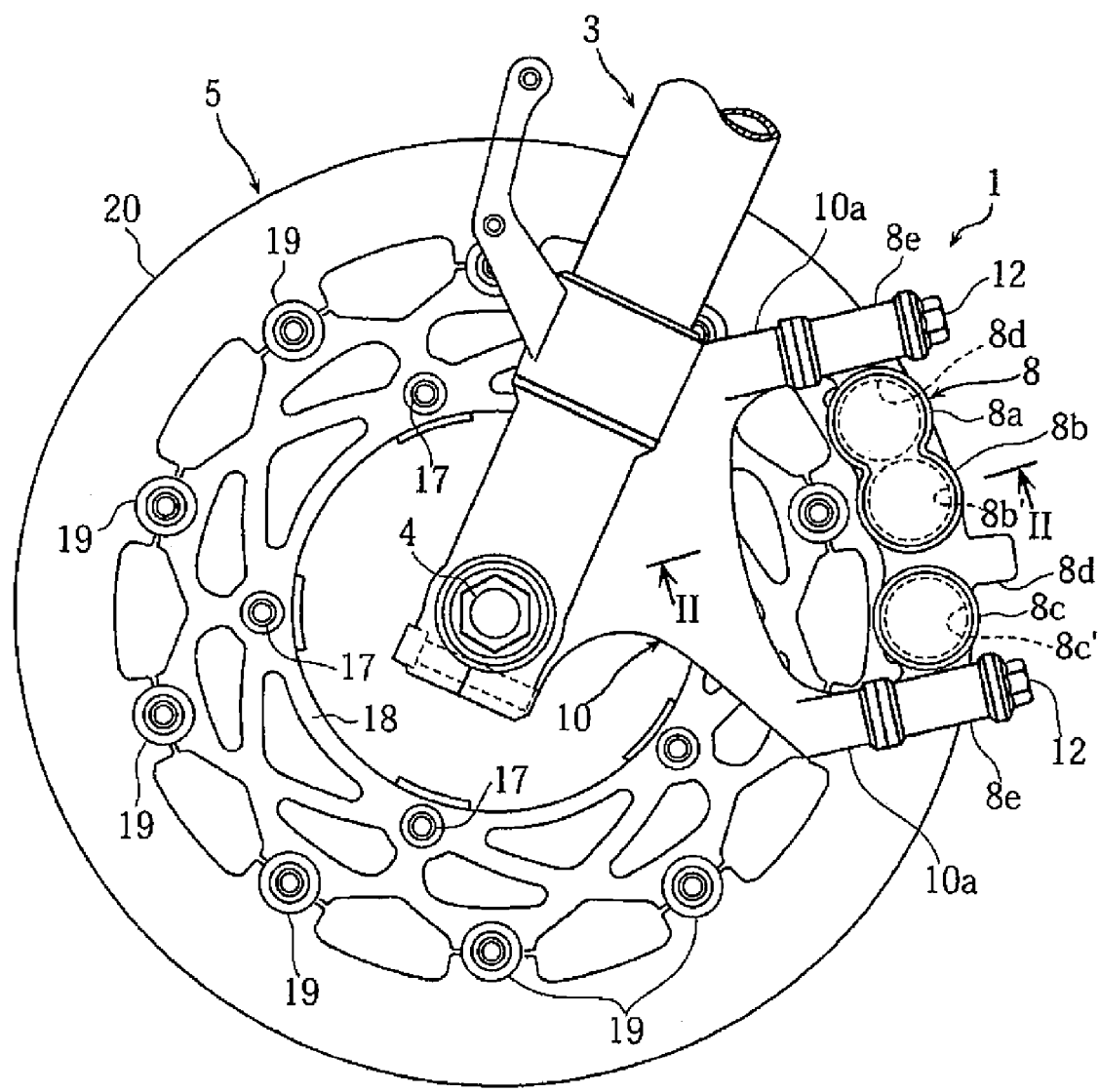
FIG. 1 is a side view of a disk braking device according to an embodiment of the invention.
Figure 2:
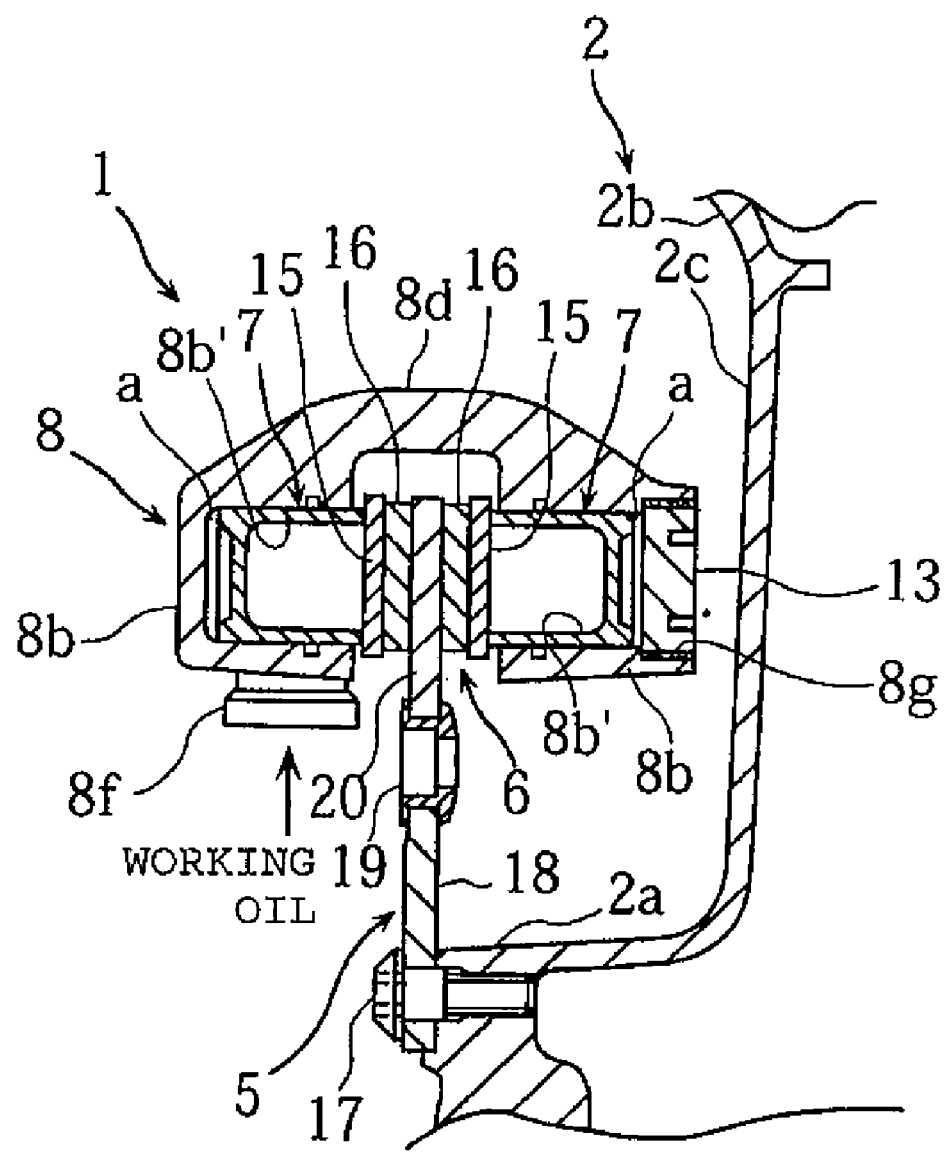
FIG. 2 is a cross sectional view of the disk braking device taken through lines II-II of FIG. 1.

An embodiment of the invention will be described below with reference to the accompanying drawings.

FIGS. 1-4 illustrate a disk braking device according to an embodiment of the invention. The illustrated embodiment is a disk braking device for motorcycles.

In the drawings, the reference numeral 1 denotes a front disk braking device arranged on a front wheel 2 of a motorcycle. The front wheel 2 is journaled by a lower end of a front fork 3. The front fork 3 is supported on a head pipe, which is fixed to a front end of a vehicle body frame (not shown), to be steered left and right, and a steering handle (not shown) is mounted to an upper end of the front fork 3.

The front wheel 2 is constructed such that a hub 2a and a rim 2b with a tire (not shown) mounted thereto are connected to each other by a plurality of spokes, and an axle shaft 4 is inserted into the hub 2a with a bearing (not shown) therebetween and is fixed to the front fork 3.

A rearwardly projecting caliper bracket 10 is formed on a lower end of the front fork 3. A pair of upper and lower mounts 10a, 10a projecting radially and rearward are integrally formed with the caliper bracket 10.

The disk braking device 1 comprises a disk plate 5 fixed to the hub 2a of the front wheel 2 to rotate with the front wheel 2, a brake pad 6 that generates a frictional force between it and the disk plate 5, a plurality of pistons 7 that bring the brake pad 6 into pressure contact with the disk plate 5, and a caliper body 8 that holds the respective pistons 7.

The caliper body 8 comprises pairs of first, second, and third left and right piston holding portions 8a, 8b, 8c arranged in opposition with the disk plate 5 therebetween and along an outer periphery thereof, a bridge 8d arranged in a manner to straddle an outside of the disk plate 5 and to join the first, second, and third left and right piston holding portions 8a, 8b, 8c together, and mount bosses 8e, 8e integrally formed with the first and third piston holding portions 8a, 8c, which are positioned on both ends.

The upper and lower mount bosses 8e, 8e are clamped and fixed to the respective mounts 10a of the caliper bracket 10 by bolts 12, 12 threadedly inserted from radially outward.

The pistons 7 are inserted into and arranged in respective holding holes 8a'-8c' of the first, second, and third left and right piston holding portions 8a-8c to be able to advance and retreat. Hydraulic pressure chambers 'a' are defined between the pistons 7 and bottoms of the holding holes 8a' to 8c'.

The holding holes 8a'-8c' are formed by machining left and right holding holes 8b', 8b' with a tool that is inserted from a side wall (inner side wall) of the caliper body 8, inserting the pistons 7, 7 into the respective holding holes 8b' from a work hole 8g formed by the machining, and thereafter oil-tightly closing the work hole 8g by a plug material 13. Holding holes 8a', 8c' are formed in the same manner.

The caliper body 8 is formed with a hydraulic pressure supply port 8f, through which working oil is supplied to the hydraulic pressure chambers 'a'. A master cylinder is connected to the hydraulic pressure supply port 8f through a brake hose (not shown) and a brake lever is connected to the master cylinder. The master cylinder and the brake lever are arranged on the steering handle described above.

The brake pad 6 comprises base plates 15, against which the pistons 7 abut, and friction members 16 supported by the base plates 15 to abut against the disk plate 5.

The disk plate 5 comprises a plate body 18 fixed to an outer side surface of the hub 2a by a plurality of bolts 17, and an annular brake disk 20 joined to an outer periphery of the plate body 18 by a plurality of rivet type pins 19. The friction members 16 are opposed to and abut against the brake disk 20.

Figure 3:
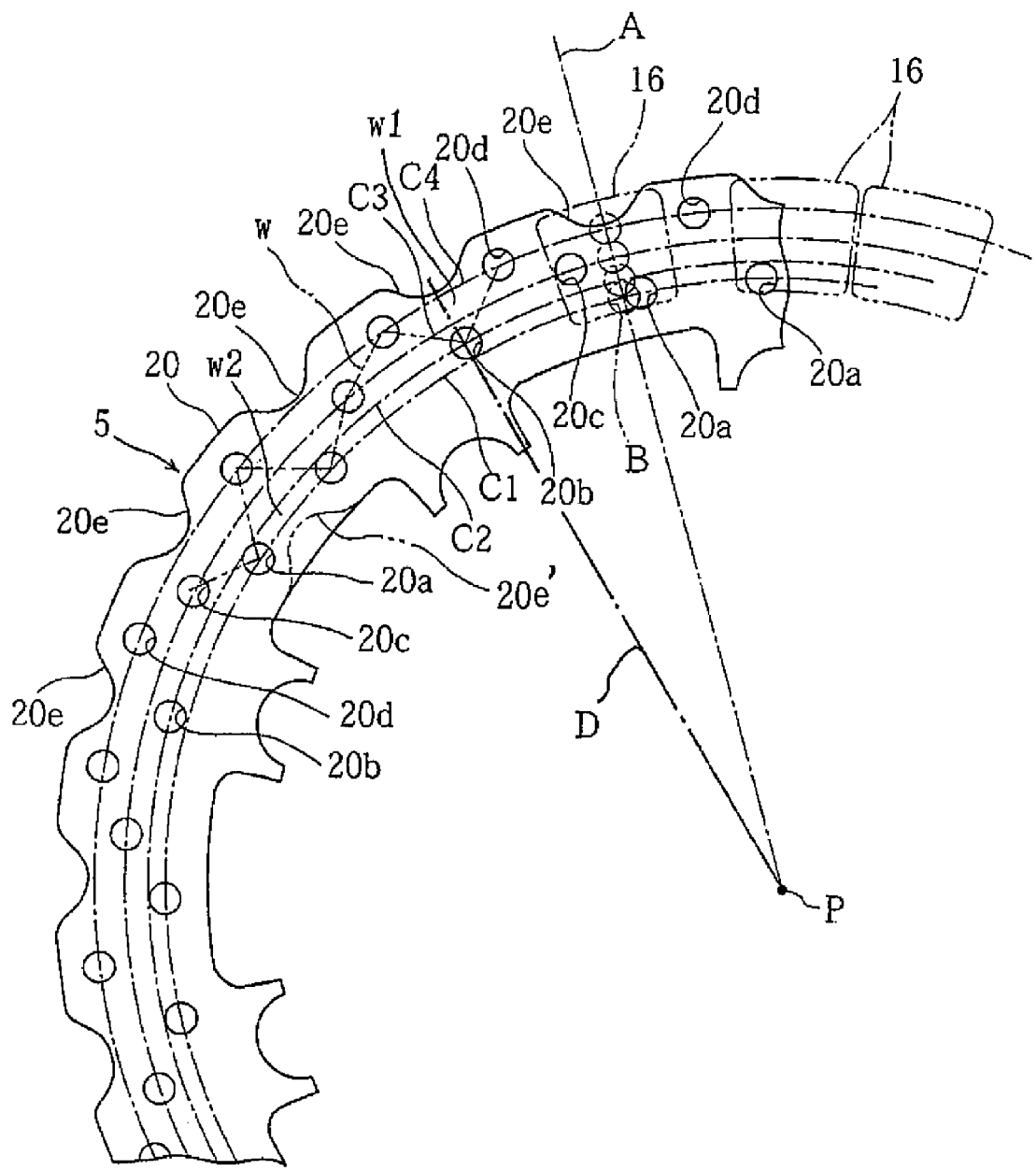
FIG. 3 is a view of a disk plate of the disk braking device.
Figure 4:
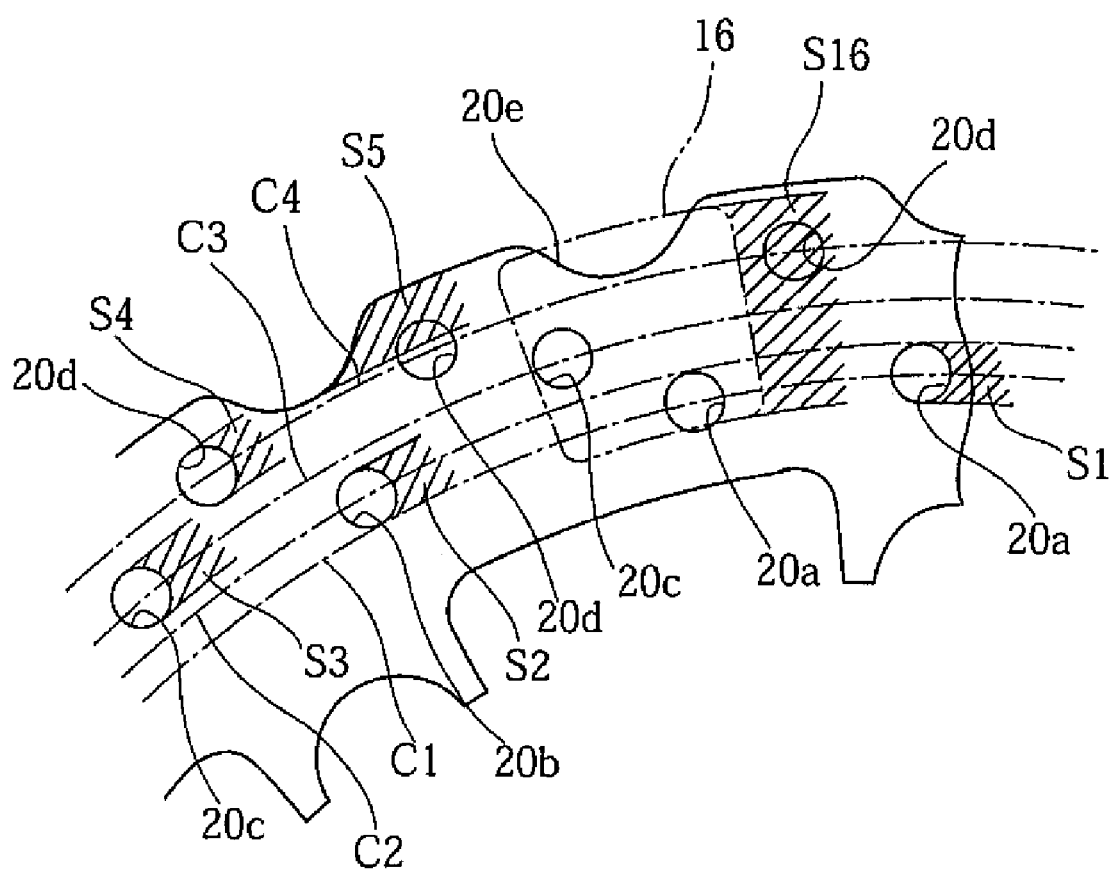
FIG. 4 is an enlarged view of an essential part of the disk plate.

The brake disk 20 is formed with multiple first to fourth through-holes 20a-20d as shown in FIG. 3. Through-holes 20a-20d are formed at predetermined circumferential intervals on first to fourth concentric circles C1-C4, which are centered on a center 'p' of rotation of the disk plate 5 and have different radii. More specifically, the first through-holes 20a, the second through-holes 20b, the third through-holes 20c, and the fourth through-holes 20d, respectively, are formed at predetermined intervals on the first concentric circle C1, the second concentric circle C2, the third concentric circle C3, and the fourth concentric circle (outer end concentric circle) C4.

Centrally-directed arcuate notches 20e are formed at predetermined circumferential intervals at an outer peripheral edge of the brake disk 20.

The notches 20e and through-holes 20a-20d are arranged so that rotational locus regions S1-S5 of notches 20e and through-holes 20a-20d formed when the disk plate 5 rotates through one revolution cover a slide locus region S16 of the friction members 16 on the brake disk 20 in all regions.

More specifically, through-holes 20a-20d and notches 20e are formed so that the rotational locus regions of the first and second through-holes 20a, 20b, the second and third through-holes 20b, 20c, and the third and fourth through-holes 20c, 20d, which are radially adjacent to each other, overlap mutually and the rotational locus region of the fourth through-holes 20d disposed radially outermost and the rotational locus region of the notches 20e overlap each other. In other words, when the notches 20e and all the first to fourth through-holes 20a-20d are moved one by one to one virtual straight line A passing through the center p of rotation of the disk plate 5, a virtual slit B is formed to fully cross a projected plane of the friction member 16 onto the brake disk 20 radially. Such virtual slits B are formed in 20 sets each time the disk plate 5 rotates through one revolution.

Only one of through-holes 20a-20d is formed on one radial line D passing through a center of the brake disk 20. In other words, through-holes 20a-20d are scattered circumferentially and arranged so as not to overlap one another radially.

Through-holes 20a-20d are arranged so that through-hole connecting lines w connecting circumferentially adjacent through-holes 20a-20d are zigzagged in a circumferential direction of the brake disk 20.

Notches 20e are directed toward recessed portions w1 of the through-hole connecting lines w from the outer peripheral edge of the brake disk 20. Also, the notches 20e are arranged so that any one of the radial lines D passes through the notch 20e.

When the brake lever is operated, the master cylinder generates hydraulic pressure that is supplied to hydraulic pressure chambers 'a' through the hydraulic pressure supply port 8f. This causes pistons 7 to advance to bring the friction members 16 into pressure contact with the brake disk 20 of the disk plate 5 to interpose the brake disk 20 therebetween. Thereby, the frictional force brakes the front wheel 2. At this time, the notches 20e and through-holes 20a-20d pass over the whole slide surfaces of the friction members 16 and attachments such as abrasion powder, etc. on the friction members 16 is removed upon the passage.

Since only one of the through-holes 20a-20d is formed on one radial line D of the brake disk 20, the brake disk 20 is formed with a heat conduction path, through which frictional heat generated in through-hole portions of the brake disk 20 is conducted to an outer peripheral edge or an inner peripheral edge thereof. In this manner, heat radiation quality of disk plate 5 is enhanced and friction member abrasion is decreased. This is an improvement over prior art configurations where through-holes are formed in a radially aligned manner, since such through-holes interrupt the heat conduction path and deteriorate the radiation quality of disk plate 5.

Also, since the notches 20e are arranged so that any one of the radial lines D passes through the notch 20e, heat generated in a through-hole portion positioned on the radial line is readily discharged outside from the notch 20e, further improving radiation quality of disk plate 5.

Since through-holes 20a-20d are arranged so that lines w connecting through-holes 20a-20d are zigzagged in the circumferential direction of the brake disk 20, and notches 20e are directed toward the recessed portions w1 of connecting lines w, the through-holes 20a-20d and the notches 20e are easy to form by press molding.

Since the rotational locus regions S1 to S5 formed when through-holes 20a-20d and notches 20e formed on brake disk 20 rotate through one revolution cover the slide locus region S16 of the friction members 16 in all the regions, through-holes 20a-20d and notches 20e pass over the whole slide surfaces of the friction members 16 each time the disk plate 5 rotates through one revolution. Thereby, attachments such as abrasion powder, etc. on the friction members 16 is removed by edges of through-holes 20a-20d and notches 20e, thereby suppressing local abrasion of the friction members 16 and improving part service life.

Also, since attachments on friction members 16 are automatically removed by frictional force with the disk plate 5 at the time of braking, it is possible to dispense with or reduce the frequency of manual cleaning work.

Also, since through-holes 20a-20d and notches 20e pass over all the surfaces of the friction members 16, it is possible to heighten the disk plate 5 in lightening and radiation quality and to suppress brake noise.

According to the embodiment, through-holes 20a-20d are formed at predetermined circumferential intervals on concentric circles C1-C4, which are centered on the center p of rotation of the disk plate 5 and have different radii, the rotational locus regions of the first and second through-holes 20a, 20b, the second and third through-holes 20b, 20c, and the third and fourth through-holes 20c, 20d mutually overlap, and the rotational locus of the fourth through-holes 20d disposed radially outermost overlaps the rotational locus region of the notches 20e.

In other words, when the notches 20e and through-holes 20a-20d are moved one by one to one virtual straight line A passing through the center p of rotation of the disk plate 5, a virtual slit B is formed to cross a projected plane of the friction member 16 onto the brake disk 20 radially. Thereby, a construction covering the rotational locus regions S1-S5 of the notches 20e and the through-holes 20a-20d over the slide locus region S16 of the friction members 16 is realized, ensuring removal of attachments.

In addition, while the notches 20e are formed on the outer peripheral edge of the brake disk 20, notches 20e' may be formed at predetermined intervals at an inner peripheral edge of the brake disk 20 as indicated by two-dot chain line in FIG.

3. In this case, notches 20e' are preferably directed toward convex portions w2 of the through-hole connecting lines w.

While the disk braking device of the invention has been described with reference to a front wheel of a motorcycle, it could also be applied to a rear wheel as well as to other vehicles such as small-sized three-wheelers, four-wheelers, ATV (all-terrain vehicles), and so oh.

The particular embodiments of the invention described in this document should be considered illustrative, rather than restrictive. Modification to the described embodiments may be made without departing from the spirit of the invention as defined by the following claims.

The invention claimed is:

1. A disk braking device comprising:
a disk plate fixed to a wheel; and
a brake pad including a friction member arranged to generate a frictional force between the brake pad and the disk plate; wherein
the disk plate includes a plurality of through-holes and a plurality of notches formed at an outer peripheral edge of the disk plate,
the through-holes are formed such that no radial line passing through a center of the disk plate and the outer peripheral edge of the disk plate passes through more than one through-hole, and the notches are arranged so that a radial line passing through one of the plurality of through-holes also passes through one of the plurality of notches, and
the plurality of through-holes are formed at circumferential intervals on a plurality of concentric circles centered about a center of the disk plate and arranged to pass through centers of the plurality of through-holes and the plurality of notches are formed at circumferential intervals at the outer peripheral edge of the disk plate, and when the plurality of notches and the plurality of through-holes are moved onto a virtual straight line passing through the center of the disk plate and the friction member is moved onto the virtual straight line, the plurality of notches and the plurality of through-holes form a virtual slit radially crossing a projected plane of the friction member onto the disk plate.

2. The disk braking device according to claim 1, wherein the plurality of through-holes are arranged so that through-hole connecting lines connecting adjacent through-holes are zigzagged along a circumferential direction of the disk plate and the plurality of notches are directed toward portions of the through-hole connecting lines that are recessed toward the center of the disk plate from the outer peripheral edge of the disk plate.

3. The disk braking device according to claim 1, wherein the disk plate is annular, the plurality of through-holes are arranged so that through-hole connecting lines connecting adjacent through-holes are zigzagged along a circumferential direction of the disk plate, and the plurality of notches are directed toward portions of the through-hole connecting lines that are convex toward the outer peripheral edge of the disk plate from an inner peripheral edge of the disk plate.

4. The disk braking device according to claim 1, wherein a rotational locus region formed when the plurality of notches and the plurality of through-holes of the disk plate rotate through one revolution covers all regions of a slide locus of the friction member on the disk plate.

5. The disk braking device according to claim 1, wherein rotational locus regions of through-holes positioned on one concentric circle overlap rotational locus regions of through-holes positioned on a radially adjacent concentric circle, and rotational locus regions of through-holes positioned on a radially-outermost concentric circle overlap rotational locus regions of the notches.

6. A motorcycle comprising the disk braking device of claim 1.

7. The disk braking device according to claim 1, wherein the virtual slit ranges over the entire length of the friction member in a radial direction thereof.

8. A disk braking device comprising:
a disk plate fixed to a wheel; and
a brake pad including a friction member arranged to generate a frictional force between the brake pad and the disk plate, wherein
the disk plate includes a plurality of through-holes and a plurality of notches formed at an outer peripheral edge of the disk plate, the through-holes are formed such that no radial line passing through a center of the disk plate and the outer peripheral edge of the disk plate passes through more than one through-hole, and the plurality of notches are arranged so that a radial line passing through one of the plurality of through-holes also passes through one of the plurality of notches,
the plurality of through-holes are arranged on a plurality of concentric circles centered about a center of the disk plate, the plurality of concentric circles are arranged to pass through centers of the plurality of through-holes, each of the plurality of through-holes is arranged on at least one of the plurality of concentric circles, and the plurality of through-holes are spaced apart from each other in a circumferential direction along the disk plate, and
a radial distances between each adjacent concentric circles increases as the plurality of concentric circles are arranged closer to the outer peripheral edge of the disk plate.

* * * * *